(12) United States Patent
Whelan et al.

(10) Patent No.: US 6,368,528 B1
(45) Date of Patent: Apr. 9, 2002

(54) METHOD OF MAKING MOLDED COMPOSITE ARTICLES

(75) Inventors: George Whelan, Newtown Forbes (IE); David C. Ritter, Geneva, IL (US); Michael Halton, Longford (IE)

(73) Assignee: Masonite Corporation, Chicago, IL (US)

( * ) Notice: Subject to any disclaimer, the term of this patent is extended or adjusted under 35 U.S.C. 154(b) by 0 days.

(21) Appl. No.: 09/425,159

(22) Filed: Oct. 21, 1999

Related U.S. Application Data

(60) Provisional application No. 60/106,286, filed on Oct. 30, 1998.

(51) Int. Cl.$^7$ .............................. B27N 3/04; B32B 5/16
(52) U.S. Cl. .................. 264/109; 156/62.2; 156/62.4; 264/115; 264/119; 264/122; 264/130
(58) Field of Search ........................... 264/109, 112, 264/113, 119, 122, 130, 131, 251, 258, 115, 121; 156/62.2, 62.4

(56) References Cited

U.S. PATENT DOCUMENTS

| | | | |
|---|---|---|---|
| 2,754,728 A | * 7/1956 | Runckel et al. | 264/122 |
| 2,757,115 A | 7/1956 | Heritage | 154/101 |
| 3,098,785 A | 7/1963 | Meiler | 162/11 |
| 3,130,114 A | 4/1964 | Nagy et al. | 162/13 |
| 3,249,667 A | * 5/1966 | Gregory et al. | 156/62.2 |
| 3,636,199 A | * 1/1972 | Jenks et al. | 156/62.2 |
| 3,668,286 A | 6/1972 | Brooks et al. | 264/26 |
| 3,880,975 A | 4/1975 | Lundmark | 264/119 |
| 4,201,802 A | 5/1980 | Vande Kieft | 427/370 |
| 4,514,255 A | 4/1985 | Maxwell et al. | 162/9 |
| 4,514,532 A | 4/1985 | Hsu et al. | 524/14 |
| 4,828,643 A | 5/1989 | Newman et al. | 156/328 |
| 4,937,100 A | 6/1990 | Lanters et al. | 427/212 |
| 5,302,330 A | 4/1994 | Umansky et al. | 264/109 |
| 5,367,040 A | 11/1994 | Teodorczyk | 528/137 |
| 5,520,777 A | 5/1996 | Shisko | 162/13 |
| 5,624,616 A | 4/1997 | Brooks | 264/83 |
| 5,779,955 A | 7/1998 | Siempelkamp | 264/109 |

FOREIGN PATENT DOCUMENTS

| | | | | |
|---|---|---|---|---|
| EP | 0 522 309 A1 | | 6/1992 | |
| JP | 63-202405 | * | 8/1988 | 264/112 |
| JP | 3-61004 | | 3/1991 | |
| JP | 3-281202 | * | 12/1991 | 264/112 |

OTHER PUBLICATIONS

Search Report for (counterpart) Irish Patent Application No. 1999/0100 dated May 18, 2000.

* cited by examiner

*Primary Examiner*—Mathieu D. Vargot
(74) *Attorney, Agent, or Firm*—Marshall, Gerstein & Borun

(57) ABSTRACT

An improved method of making a molded composite article by combining a fibrous material with a binder to form a mixture, drying the mixture to a moisture content of about 6 wt. % to about 14 wt. % based on the weight of the fibrous material to form a mat, coating at least one surface of the mat with an aqueous solution comprising one or more additives selected from the group consisting of: a wetting agent, a mold release agent, a set retarder, and a binder. Thereafter, the mat is consolidated under heat and pressure to form the molded composite article. Articles formed by this improved method exhibit superior surface characteristics (i.e., smooth, hard surfaces), and do not require the need for any further treatment, such as use of tempering oils, application of post-consolidation sealers, or post-consolidation surface sanding procedures, prior to subsequent finishing operations, such as coating, gluing, painting, or other finishing to complete a desired article for commercial use.

23 Claims, No Drawings

METHOD OF MAKING MOLDED COMPOSITE ARTICLES

CROSS-REFERENCE TO RELATED APPLICATION

This application claims the benefit of U.S. provisional patent application Ser. No. 60/106,286 filed Oct. 30, 1998, the disclosure of which is hereby incorporated herein by reference.

BACKGROUND OF THE INVENTION

1. Field of the Invention

The invention relates generally to a method of making molded composite articles from cellulosic materials and, more particularly, the invention relates to a method of making a consolidated cellulosic article exhibiting excellent surface hardness and surface smoothness characteristics.

2. Brief Description of Related Technology

One type of molded composite article is a wood composite which includes man-made boards of bonded wood sheets and/or lignocellulosic materials, commonly referred to in the art by the following exemplary terms: fiberboards such as hardboard, medium density fiberboard, and softboard; chipboards such as particleboard, waferboard; and oriented strandboard. Wood composites also include man-made boards comprising combinations of these materials.

Many different methods of manufacturing these wood composites are known in the art such as, for example, those described in Hsu et al. U.S. Pat. No. 4,514,532 and Newman et al. U.S. Pat. No. 4,828,643, the disclosures of which are hereby incorporated herein by reference. The principal processes for the manufacture of fiberboard include: (a) wet felted/wet pressed or "wet" processes; (b) dry felted/dry pressed or "dry" processes; and, (c) wet felted/dry pressed or "wet-dry" processes. Synthetic resins, such as amino resins, phenol-formaldehyde ("PF") resins, or modified PF resins, are often used as binders in these processes. Suitable phenolic resins may include those described in Teodorczyk U.S. Pat. No. 5,367,040, which is hereby incorporated herein by reference.

Generally, in a wet process, cellulosic fibers (e.g., woody chip material subjected to fiberization in a pressurized refiner to form wood fibers) are blended in a vessel with large amounts of water to form a slurry. The slurry preferably has sufficient water content to suspend a majority of the wood fibers and preferably has a water content of at least 95 percent by weight (wt. %). The water is used to distribute a synthetic resin binder, such as a phenol-formaldehyde resin over the wood fibers. This mixture is deposited onto a water-pervious support member, such as a fine screen or a Fourdrinier wire, and pre-compressed, whereby much of the water is removed to leave a wet mat of cellulosic material having, for example, a moisture content of at least about 50 wt. % based on the weight of dry cellulosic material. The wet mat is transferred to a press and consolidated under heat and pressure to form the molded wood composite.

A wet-dry forming process can also be used to produce wood composites. Preferably, a wet-dry process begins by blending cellulosic material (e.g., wood fiber) in a vessel with a large amount of water. This slurry is then blended with a resin binder. The blend is then deposited onto a water-pervious support member, where a large percentage (e.g., 50 wt. % or more) of the water is removed, thereby leaving a wet mat of cellulosic material having a water content of about 40 wt. % to about 60 wt. %, for example. This wet mat is then transferred to a zone where much of the remaining water is removed by evaporation by heat to form a dried mat. The dried mat preferably has a moisture content of about 10 wt. % or less. The dried mat is then transferred to a press and consolidated under heat and pressure to form a wood composite which may be a flat board or a molded product, for example. The product can be molded into various shapes or geometries depending on the intended use.

In a dry forming process, filler material, such as cellulosic fibers, is generally conveyed in a gaseous stream or by mechanical means. For example, the fibers supplied from a fiberizing apparatus (e.g., a pressurized refiner) may be coated with a thermosetting synthetic resin, such as a phenol-formaldehyde resin, in a blowline blending procedure, wherein the resin is blended with the fiber with the aid of air turbulence. Thereafter, the resin-coated fibers from the blowline can be randomly formed into a mat by air blowing the fibers onto a support member. Optionally, the fibers, either before or after formation of the mat, can be subjected to pre-press drying, for example in a tube-like dryer. The formed mat, typically having a moisture content of less than about 10 wt. % and preferably about 5 wt. % to about 10 wt. %, is then pressed under heat and pressure to cure the thermosetting resin and to compress the mat into an integral consolidated structure.

Steam injection pressing is a consolidation step that can be used, for example, under certain circumstances in dry and wet-dry process production of consolidated cellulosic composites. In steam injection pressing, steam is injected through perforated heating press platens, into, through, and then out of a mat that includes the synthetic resin and the filler material. The steam condenses on surfaces of the filler and heats the mat. The heat transferred by the steam to the mat as well as the heat transferred from the press platens to the mat cause the resin to cure. When compared with conventional pressing operations, steam injection pressing may, under certain circumstances, provide a variety of advantages, such as, for example, shorter press time, a more rapid and satisfactory cure of thicker panels, and products having more uniform densities.

Consolidation of mats containing conventional phenolic resins, however, often results in a final composite product exhibiting undesirable characteristics, such as poor bond formation and/or starved glue lines. In order to ensure good bond formation, it is desirable to have a uniform dispersion of the phenolic resin throughout the mat. However, because phenolic resins are water soluble, when mats containing such resins are consolidated (and especially when steam pressed) water present in the mat (or injected by steam injection means) solubilizes the resin. The solubilized resin undesirably migrates to regions of the mat such that the resin is no longer uniformly dispersed, resulting in a product having resin-starved regions and poor bond formation.

Poor bond formation also is attributable to the known phenomena of pre-cure (i.e., where the resin cures before the mat has hardened to an integral consolidated structure) and moisture retardation (i.e., where water present in the core or interior of the mat prevents the mat temperature from exceeding the evaporation temperature of water, 100° C., thereby retarding the resin cure). Starved glue lines caused by excess penetration of the resin can oftentimes occur near the surface of the formed product where the resin has undesirably been washed from the surface of the mat and has migrated to edges of the mat or to the mat core. The absence of resin near the product's surface—hence, the onset of pre-cure and the presence of starved glue lines—results in a board product having soft surfaces, characterized by loose fibers and/or flaking of the cellulosic material that has not properly adhered to the body or core of the board.

Soft surfaces are particularly undesirable because it is difficult to paint soft surfaces or apply other finishing components (e.g., water resistant sealers) to soft surfaces. Furthermore, the integrity, surface smoothness, and aesthetic characteristics of the board product or molded product, either grained or smooth, are compromised by the soft surfaces.

Some prior attempts at preventing the occurrence of soft surfaces have included the application of a sealer, such as an acrylic sealer, to one surface of the fibrous mat prior to consolidating the mat in a heated press. Practically, however, these attempts do not address or teach one skilled in the art how to prevent the occurrence of soft surfaces on those surfaces that the sealer is not (or cannot be) applied to. Additionally, acrylic sealers may undesirably damage the surfaces of a molding die or press platens of a pressing apparatus. Other prior attempts at preventing the occurrence of soft surfaces have included the application of a material, such as drying oil, to both top and bottom surfaces of a consolidated product in an effort to "repair" the surfaces of the consolidated product and to increase the surface integrity of the product in subsequent post-pressing operation. Still other methods include blending a resin with a dried fibrous material.

All of the prior approaches to combating the occurrence of soft surfaces, however, are somewhat inefficient, inconvenient, time-consuming, and require considerable amounts of extra equipment and, therefore, add substantially to the cost of the finished product. Furthermore, some of the prior approaches are simply not suitable for continuous production processes. Accordingly, it would be desirable to overcome one or more of these problems. More specifically, it would be desirable to provide an improved method of making consolidated wood composites that do not have undesired soft surfaces.

SUMMARY OF THE INVENTION

It is an object of the invention to overcome one or more of the problems described above.

According to the invention a method of making a molded composite article is provided, wherein the method includes the steps of combining a fibrous material with a binder resin and a sizing agent to form a mixture. The method further includes the step of drying the mixture to a moisture content of about 6 percent by weight (wt. %) to about 14 wt. % based on the weight of the fibrous material to form a mat, and thereafter coating a surface of the mat with about 3 grams per square meter ($g/m^2$) to about 50 $g/m^2$ of an aqueous solution. The aqueous solution comprises a wetting agent, a mold release agent, a set retarder, and, optionally, a thermosetting resin. Once coated with the aqueous solution the mat is consolidated under heat and pressure to form the molded composite article.

Further objects and advantages of the invention may become apparent to those skilled in the art from a review of the following detailed description, taken in conjunction with the appended claims. It should be noted that while the invention is susceptible of embodiments in various forms, described hereinafter are specific embodiments of the invention with the understanding that the present disclosure is intended as illustrative, and is not intended to limit the invention to the specific embodiments described herein.

DETAILED DESCRIPTION OF THE INVENTION

According to the invention a method of making a molded composite article is provided, wherein the method includes the steps of combining a fibrous material with a binder resin and a sizing agent to form a mixture. The method further includes the step of drying the mixture to a moisture content of about 6 percent by weight (wt. %) to about 14 wt. % based on the weight of the fibrous material to form a mat, and thereafter coating a surface of the mat with about 3 grams per square meter ($g/m^2$) to about 50 $g/m^2$ of an aqueous solution. The aqueous solution comprises a wetting agent, a mold release agent, a set retarder, and, optionally, a thermosetting resin. Once coated with the aqueous solution the mat is consolidated under heat and pressure to form the molded composite article.

According to a preferred embodiment of the invention, a method of making a molded composite article includes the steps of blending a cellulosic material with water in a steam-pressurized vessel to form a fibrous material, and passing the fibrous material through a discharge conduit of the vessel and into a blowline wherein the fibrous material is combined with a binder resin (i.e., a thermosetting resin) and a sizing agent to form a mixture. Thereafter, the mixture is dried to a moisture content of about 6 wt. % to about 14 wt. % based on the weight of the fibrous material. The dried mixture is deposited onto a water-pervious support member to form a mat. The method further includes the step of coating a surface of the dried mat with about 3 $g/m^2$ to about 50 $g/m^2$ of an aqueous solution. The aqueous solution includes one or more of a wetting agent, a mold release agent, a set retarder, and a thermosetting resin. Once coated with the aqueous solution the coated mat is consolidated under heat and pressure to form the molded composite article.

The cellulosic material typically has a moisture content of about 30 wt. % to about 60 wt. % based on the weight of the cellulosic material. Suitable cellulosic material for use in accordance with the invention generally includes lignocellulosic fibers and lignocellulosic biomass. The lignocellulosic fibers primarily include wood fibers formed by fiberization of woody chip material, but are not limited solely to such wood fibers. Lignocellulosic biomass includes lignocellulose derived from biomass sources such as, for example, trees, plants, and other vegetation, agricultural products and wastes (e.g., corn, fruit, garbage ensilage, etc.), algae and other marine plants.

The cellulosic material is combined with water in a vessel, preferably a pressurized vessel, and more preferably a steam-pressurized refiner known in the art as being suitable for preparing a fibrous material, to form a fibrous material. A preferred weight ratio of water combined with the cellulosic material is about 1 to 1. A more preferable weight ratio of water to cellulosic material, however, is about 0.8 to 1. Within the vessel, the cellulosic material is exposed to heat and saturated steam having a pressure of about four bars to about eight bars, preferably about five bars to about seven bars. A suitable residence time for the cellulosic material within the vessel is about two minutes to about eight minutes, preferably about three minutes to about five minutes. The temperature of this fiberization process step within the steam-pressurized refiner is set by the specified saturated steam pressure.

The vessel includes a discharge conduit through which the formed fibrous material exits. As the fibrous material exits the vessel it is combined with the binder resin and a sizing agent before the combined mixture is deposited onto a water-pervious support member. This combination occurs through known techniques referred to in the art as "blowline blending." The binder resin is added to bind the fibrous material, and the setting agent is added to impart water repellency to the finished consolidated article.

Either an amino resin or a phenol formaldehyde resin may be used as the binder resin, however, an amino resin is preferred. An exemplary amino resin for use in accordance with the invention is DYNOCHEM L221, and an exemplary, commercially-available phenol formaldehyde resin suitable for use in accordance with the invention is DYNOCHEM DPL5690, both of which are available from DYNOCHEM U.K. Ltd. of Duxford, England. Generally, the amount of the binder resin that is blended with the fibrous material is about 3 wt. % to about 15 wt. % based on the weight of the fibrous material. Where the binder resin is an amino resin, the amount of resin that is blended with the fibrous material is about 7 wt. % to about 15 wt. % based on the weight of the fibrous material, preferably about 8 wt. % to about 10 wt. %. Where the binder resin is a phenol formaldehyde resin, the amount of resin that is blended with the fibrous material is about 3 wt. % to about 6 wt. % based on the weight of the fibrous material, preferably about 3 wt. % to about 4 wt. %.

Any sizing agent known in the art may be blended with the fibrous material, however, a solid or emulsion-type petrochemical-based sizing agent is preferred, such as Mobil M75 which is available from Mobil Oil Corporation. Preferably, the amount of sizing agent that is blended with the fibrous material is about 1 wt. % to about 3 wt. % based on the weight of the fibrous material. The amount of the sizing agent will vary within the aforementioned range based on the type of article being manufactured. For example, if an exterior article is being made, the amount of the sizing agent should be higher than if an interior article were being made.

As noted above, the resin- and sizing agent-containing fibrous material is dried to a moisture content of about 6 wt. % to about 14 wt. % before it is deposited onto a water-pervious support member, such as a fine screen or a Fourdrinier wire, to form a mat having a moisture content of about 6 wt. % to about 14 wt. %, and preferably about 9 wt. % to about 11 wt. % based on the weight of the fibrous material.

The moisture content of the fibrous material of the mat according to the present invention is in stark contrast to that taught by any known prior method of making molded composite articles. Conventional wet-dry processes of forming molded composite articles specified fibrous material moisture contents of about 40 wt. % to about 60 wt. %. Conventional dry processes of forming molded composite articles specified fibrous material moisture contents of less than about 5 wt. %.

Quite surprisingly, it has been found that a moisture content in excess of that suggested for a dry process and less than that suggested for a wet-dry process, in combination with the spray or coating step, described below, provides significant and unexpected advantages. It is believed that the presences of too little moisture (i.e., less than about 6 wt. %) will cause the mat to prematurely cure, whereas the presence of too much moisture (i.e., more than about 14 wt. %) will result in a molded composite article exhibiting severe de-lamination and poor bonding of fibrous materials. It has been found, however, that the presence of about 6 wt. % to about 14 wt. % moisture in the fibrous material of the mat, and the subsequent coating of the mat surface(s), results in a mat which, when pressed, does not prematurely cure and does not suffer from the de-lamination problem or display poor fiber bonding within its core or near its coated surfaces.

In accordance with the invention, at least one surface (and preferably both top and bottom surfaces) of the fibrous material having a moisture content of about 6 wt. % to about 14 wt. % is (are) coated with an aqueous solution comprising various additives prior to the consolidation step. The aqueous solution of additives includes: a wetting agent; a mold release agent; a set retarder; and, optionally, a thermosetting resin. Generally, any wetting agent, mold release agent, and set retarder known in the art are suitable for use in accordance with the invention. Preferably, however, the wetting agent is a combination of an anionic and a non-ionic surfactant, the mold release agent is a combination of an anionic and a non-ionic surfactant, and the set retarder is also a combination of an anionic and a non-ionic surfactant. One material that acts as a combined wetting agent/mold release agent/set retarder is commercially-available under the product name Wurtz 529S from the Peter Wurtz Company of Switzerland. Binder (i.e., thermosetting) resins suitable for use in the aqueous solution can be identical to those used during the blowline blending step. However, the binder resin need not be identical to those used during the blowline blending step.

A preferred aqueous solution for use in accordance with the invention is made up of about 0.15 wt. % to about 10 wt. % of the wetting agent, about 0.15 wt. % to about 10 wt. % of the mold release agent, about 0.15 wt. % to about 10 wt. % of the set retarder, and about 0 wt. % to about 30 wt. % of the thermosetting resin, the balance being water. A more preferred aqueous solution for use in accordance with the invention, however, is made up of about 0.25 wt. % to about 3 wt. % of the wetting agent, about 0.25 wt. % to about 3 wt. % of the mold release agent, about 0.25 wt. % to about 3 wt. % of the set retarder, and about 10 wt. % to about 15 wt. % of the thermosetting resin, the balance being water. The amount of the aqueous solution added to the fibrous material is in a range of about 3 $g/m^2$ ($g/m^2$) to about 50 $g/m^2$, preferably about 20 $g/m^2$ to about 35 $g/m^2$, and more preferably about 25 $g/m^2$ to about 30 $g/m^2$. The amount of the aqueous solution added to the fibrous material is dependent upon the amount of resin present in the solution. For example, if there is a high concentration of the thermosetting resin in the solution, lower amounts of the solution will need to be sprayed or coated onto the board surface(s) to achieve the desired results. Conversely, if there is a low concentration of the thermosetting resin in the solution, higher amounts of the solution will need to be sprayed or coated onto the board surface(s) to achieve the desired results.

After the fibrous mat has been coated with the aqueous solution, the mat is placed in a suitable pressing apparatus and consolidated to form the molded composite article. The pressing apparatus preferably has press platens operating at a temperature in a range of about 130° C. to about 230° C., depending on the type of binder resin used. For example, if the binder resin is an amino resin, then the temperature of the press platens should be about 130° C. to about 190° C., more preferably about 155° C. to about 175° C. If the binder resin is a phenol formaldehyde resin, however, then the temperature of the press platens should be about 190° C. to about 230° C., more preferably about 215° C. to about 225° C. Press times generally are relatively short, and are preferably in a range of about 15 seconds to about 35 seconds. These consolidation parameters, however, are variable depending upon the materials and apparatus being used. As will be apparent to those of ordinary skill in the art, desirable pressing temperatures vary according to various factors, including, but not limited to, the following: the thickness of the board, the type of cellulosic material being pressed; the moisture content of the cellulosic material, the press time, and the specific thermosetting resin which is used.

After the consolidation step, the formed molded composite article is removed from the press and cooled to ambient temperature. Because the molded composite article has superior surface quality without any further treatment, the need for: (a) tempering the formed article with oils; (b) post-press sealers; and/or (c) surface sanding operations to remove loose fibers, is either greatly reduced or altogether eliminated. Hence, after the article has been formed in the press and cooled, it may be immediately transported for coating, gluing, painting, or other finishing to complete a desired product for commercial use.

The inventive method enables the manufacture of a molded composite article having very hard surfaces that do not require conventional post-pressing treatment (e.g., tempering, post-press surface sanding, and/or post-press application of sealers) in order to produce a surface free of loose fiber and acceptable for painting and/or gluing of additional parts. This convenience is afforded by the presence of additives in the aqueous solution which retard the reaction of the thermosetting resin at the mat surface, permit greater dispersion of water into the fibrous mat, and which enhance the removal of the molded article from within the pressing apparatus. Additionally, by heat pressing the fibrous mat having the specified moisture content, vaporized water enhances compression of the fibrous material and, therefore, enhances intimate fiber-to-fiber contact to produce an integrally sound board and board surface. The invention enables the manufacture of molded, wood grained fibrous products having superior surface characteristics when compared to similar products made by conventional methods. Additionally, the invention enables the manufacture of molded, smooth fibrous products having superior surface characteristics when compared to similar products made by conventional methods.

The foregoing description is given for clearness of understanding only, and no unnecessary limitations should be understood therefrom, as modifications within the scope of the invention may be apparent to those skilled in the art.

What is claimed is:

1. A method of making a molded composite article, the method comprising the steps of:
   (a) providing a fibrous material;
   (b) combining the fibrous material with a binder resin and a sizing agent to form a mixture;
   (c) drying the mixture to a moisture content of about 6 wt. % to about 14 wt. % based on the weight of the fibrous material to form a mat;
   (d) coating a surface of the mat produced in step (c) with about 3 g/m² to about 50 g/m² of an aqueous solution of:
      (i) a wetting agent;
      (ii) a mold release agent;
      (iii) a set retarder; and, optionally,
      (iv) a thermosetting resin; and,
   (e) consolidating the mat produced in step (d) under heat and pressure to form the molded composite article.

2. The method of claim 1, wherein the mixture of step (c) is dried to a moisture content of about 9 wt. % to about 11 wt. % based on the weight of the fibrous material.

3. The method of claim 1, wherein in step (d) the fibrous material has a moisture content in a range of about 6 wt. % to about 14 wt. % based on the weight of the fibrous material.

4. The method of claim 3, wherein in step (d) the fibrous material has a moisture content in a range of about 9 wt. % to about 11 wt. % based on the weight of the fibrous material.

5. The method of claim 1, wherein the solution of step (d) further comprises:

(i) about 0.15 wt. % to about 10 wt. % of a wetting agent based on the total weight of the solution;
(ii) about 0.15 wt. % to about 10 wt. % of a mold release agent based on the total weight of the solution;
(iii) about 0.15 wt. % to about 10 wt. % of a set retarder based on the total weight of the solution;
(iv) about 0 wt. % to about 30 wt. % of a thermosetting resin based on the total weight of the solution; and,
(v) the balance being water.

6. The method of claim 5, wherein the solution of step (d) further comprises:
(i) about 0.25 wt. % to about 3 wt. % of a wetting agent based on the total weight of the solution;
(ii) about 0.25 wt. % to about 3 wt. % of a mold release agent based on the total weight of the solution;
(iii) about 0.25 wt. % to about 3 wt. % of a set retarder based on the total weight of the solution;
(iv) about 10 wt. % to about 15 wt. % of a thermosetting resin based on the total weight of the solution; and,
(v) the balance being water.

7. The method of claim 1, wherein step (d) further comprises coating a surface of the mat produced in step (c) with about 20 g/m² to about 35 g/m² with the aqueous solution.

8. The method of claim 7, wherein step (d) further comprises coating a surface of the mat produced in step (c) with about 25 g/m² to about 30 g/m² with the aqueous solution.

9. The method of claim 1, wherein the consolidation step (e) is carried out at a press temperature of about 130° C. to about 230° C. for a press time period of about 15 seconds to about 35 seconds.

10. The method of claim 1, wherein step (a) further comprises blending a cellulosic material with water in a pressurized vessel to form a fibrous material.

11. The method of claim 10, wherein step (a) further comprises heating the cellulosic material and water in the vessel for a time period of about two minutes to about eight minutes under an elevated pressure of about four bars to about eight bars to produce said fibrous material.

12. The method of claim 11, wherein step (a) further comprises heating the cellulosic material and water in the vessel for a time period of about three minutes to about five minutes under an elevated pressure of about five bars to about seven bars to produce said fibrous material.

13. The method of claim 10, wherein the cellulosic material has a moisture content of about 30 wt. % to about 60 wt. % based on the weight of the cellulosic material, and is selected from the group consisting of wood chips and lignocellulosic biomass.

14. The method of claim 10, wherein step (b) further comprises combining the fibrous material with the binder and the sizing agent as the fibrous material passes through a discharge conduit of the vessel.

15. The method of claim 14, wherein in step (b) the sizing agent is combined with the fibrous material in an amount of about 1 wt. % to about 3 wt. % based on the weight of the fibrous material obtained from step (a).

16. The method of claim 15, wherein the consolidation step (e) is carried out at a press temperature of about 130° C. to about 190° C.

17. The method of claim 15, wherein the consolidation step (e) is carried out at a press temperature of about 190° C. to about 230° C.

18. The method of claim 14, wherein in step (b) the binder resin is combined with the fibrous material at a rate of about 3 wt. % to about 15 wt. % based on the weight of the fibrous material obtained from step (a).

19. The method of claim 18, wherein in step (b) the binder resin is an amino resin and is combined with the fibrous material at a rate of about 7 wt. % to about 15 wt. % based on the weight of the fibrous material obtained from step (a).

20. The method of claim 19, wherein in step (b) the sizing agent is combined with the fibrous material in an amount of about 1 wt. % to about 3 wt. % based on the weight of the fibrous material obtained from step (a).

21. The method of claim 18, wherein in step (b) the binder resin is a phenol formaldehyde resin and is combined with the fibrous material at a rate of about 3 wt. % to about 6 wt. % based on the weight of the fibrous material obtained from step (a).

22. The method of claim 21, wherein in step (b) the sizing agent is combined with the fibrous material in an amount of about 1 wt. % to about 3 wt. % based on the weight of the fibrous material obtained from step (a).

23. The method of claim 18, wherein in step (b) the sizing agent is combined with the fibrous material in an amount of about 1 wt. % to about 3 wt. % based on the weight of the fibrous material obtained from step (a).

* * * * *